US010202144B2

(12) United States Patent
Brown et al.

(10) Patent No.: US 10,202,144 B2
(45) Date of Patent: Feb. 12, 2019

(54) VEHICLE CURVATURE DETERMINATION

(71) Applicant: Ford Global Technologies, LLC, Dearborn, MI (US)

(72) Inventors: Andrew Brown, Canton, MI (US); Scott J. Lauffer, Northville, MI (US); John P. Joyce, West Bloomfield, MI (US); Steven R. El Aile, Sterling Heights, MI (US); Tobias John Pallett, Farmington, MI (US); Shane Elwart, Ypsilanti, MI (US); Wayne Williams, Livonia, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 155 days.

(21) Appl. No.: 14/962,265

(22) Filed: Dec. 8, 2015

(65) Prior Publication Data
US 2017/0158225 A1   Jun. 8, 2017

(51) Int. Cl.
G05D 1/02 (2006.01)
B62D 5/04 (2006.01)
B62D 15/02 (2006.01)
G05D 1/00 (2006.01)

(52) U.S. Cl.
CPC ......... B62D 5/0457 (2013.01); B62D 15/021 (2013.01); B62D 15/025 (2013.01); G05D 1/0088 (2013.01); G05D 1/024 (2013.01); G05D 1/0231 (2013.01); G05D 1/0255 (2013.01)

(58) Field of Classification Search
CPC .............................. B62D 5/0457; B05D 1/02
USPC .......... 701/22, 28, 30.5, 31.4; 340/438, 439, 340/441
See application file for complete search history.

(56) References Cited

U.S. PATENT DOCUMENTS

| 7,054,738 | B1 | 5/2006 | Stotsky |
| 7,756,640 | B2 | 7/2010 | Ueyama et al. |
| 8,170,739 | B2 | 5/2012 | Lee |
| 8,244,408 | B2 | 8/2012 | Lee et al. |
| 8,686,845 | B2 * | 4/2014 | Pilutti ...................... B60Q 1/52 340/435 |
| 9,145,116 | B2 * | 9/2015 | Clarke .................. B60W 30/00 |
| 9,527,484 | B2 | 12/2016 | Minarcin |

(Continued)

FOREIGN PATENT DOCUMENTS

| CN | 106030609 A | * 10/2016 | ............ B60W 30/00 |
| EP | 0448059 A2 | 9/1991 | |

(Continued)

OTHER PUBLICATIONS

On the Optimal Speed Profile for Eco-Driving on Curved Roads; Feng Ding; Hui Jin; IEEE Transactions on Intelligent Transportation Systems; Year: 2018, (Early Access); pp. 1-11. (Year: 2018).*
Effective navigation in narrow areas: A planning method for autonomous cars; Domokos Kiss; Dávid Papp2017 IEEE 15th International Symposium on Applied Machine Intelligence and Informatics (SAMI)Year: 2017 (Year: 2017).*

(Continued)

Primary Examiner — Cuong H Nguyen
(74) Attorney, Agent, or Firm — Frank A. MacKenzie; Bejin Bieneman PLC

(57) ABSTRACT

A current state of a vehicle is identified. Vehicle path curvature limits are determined. A curvature performance profile to follow is determined based at least in part the vehicle path curvature limits. A direction of the vehicle is controlled based at least in part the curvature performance profile.

20 Claims, 10 Drawing Sheets t0 - t1 = delay in responding to request
t1 - t2 = ramp up from current brake to full brake effort
t2 - t3 = reduced braking due to pitching of vehicle
t3 - t4 = reduced braking due to brake fade t0 - t1 = delay in responding to request
t1 - t2 = ramp up from current curvature to full curvature based on max rate signal
t2 - t3 = reduced curvature due to understeer/oversteer of vehicle
t3 - t4 = reduced curvature due to roll of vehicle

(56) References Cited

U.S. PATENT DOCUMENTS

| | | | |
|---|---|---|---|
| 9,738,284 | B2 | 8/2017 | Pallett |
| 2003/0171868 | A1 | 9/2003 | Morishita et al. |
| 2003/0222774 | A1 | 12/2003 | Koenigsberg et al. |
| 2005/0125208 | A1 | 6/2005 | Boyd et al. |
| 2005/0264267 | A1 | 12/2005 | Horie et al. |
| 2006/0041343 | A1 | 2/2006 | Zaremba et al. |
| 2006/0164259 | A1* | 7/2006 | Winkler .............. G08G 1/127 340/944 |
| 2007/0010938 | A1 | 1/2007 | Kubota et al. |
| 2007/0088469 | A1 | 4/2007 | Schmiedel et al. |
| 2007/0293962 | A1* | 12/2007 | Kimura .............. G05B 19/4103 700/97 |
| 2009/0192684 | A1 | 7/2009 | Cullen et al. |
| 2010/0188203 | A1 | 7/2010 | Wallace et al. |
| 2010/0211270 | A1 | 8/2010 | Chin et al. |
| 2010/0280695 | A1 | 11/2010 | Mulot et al. |
| 2011/0205045 | A1* | 8/2011 | Pilutti .............. B60Q 1/52 340/441 |
| 2012/0221216 | A1 | 8/2012 | Chauncey et al. |
| 2012/0245773 | A1 | 9/2012 | Suzuki et al. |
| 2013/0054128 | A1 | 2/2013 | Moshchuk et al. |
| 2013/0060409 | A1 | 3/2013 | Matsushita et al. |
| 2013/0096788 | A1 | 4/2013 | Cullen et al. |
| 2013/0144474 | A1 | 6/2013 | Ricci |
| 2013/0328386 | A1 | 12/2013 | Strengert et al. |
| 2014/0330470 | A1 | 11/2014 | Ozaki et al. |
| 2015/0044641 | A1 | 2/2015 | Chauncey et al. |
| 2015/0100216 | A1 | 4/2015 | Rayes |
| 2015/0151725 | A1* | 6/2015 | Clarke .............. B60W 30/00 701/28 |
| 2015/0224981 | A1 | 8/2015 | Fujishiro et al. |
| 2017/0076599 | A1* | 3/2017 | Gupta .............. B60Q 9/00 |
| 2017/0160745 | A1* | 6/2017 | Lauffer .............. G01S 13/931 |

FOREIGN PATENT DOCUMENTS

| | | | | |
|---|---|---|---|---|
| EP | 3092599 | A1 * | 11/2016 | ............ B60W 30/00 |
| WO | WO-2015083009 | A1 * | 6/2015 | ............ B60W 30/00 |

OTHER PUBLICATIONS

Longitudinal Model Predictive Control with comfortable speed planner; Jose A. Matute; Mauricio Marcano; Asier Zubizarreta; Joshue Perez; 2018 IEEE International Conference on Autonomous Robot Systems and Competitions (ICARSC); Year: 2018 (Year: 2018).*

Motion planning for urban autonomous driving using Bézier curves and MPCXiangjun Qian; Iñaki Navarro; Arnaud de La Fortelle; Fabien Moutarde2016 IEEE 19th International Conference on Intelligent Transportation Systems (ITSC)Year: 2016 (Year: 2016).*

Kritayakirana, "Autonomous Vehicle Control at the Limits of Handling", Dissertation, Stanford University, Jun. 2012 (215 pages).

Reschka et al., "Safe, Dynamic and Comfortable Longitudinal Control for an Autonomous Vehicle", 2012 Intelligent Vehicles Symposium, Alcala de Henares, Spain, Jun. 3-7, 2012, © 2012 IEEE (6 pages).

Taylor et al., "A Comparative Study of Vision-Based Lateral Control Strategies for Autonomous Highway Driving" (18 pages).

Final Office Action dated Aug. 8, 2017 on U.S. Appl. No. 14/962,259 (24 pages).

UK Search Report 16452P; GB Appl. 1620804.3; dated May 26, 2017; 3 pages.

Non-Final Office Action dated Feb. 9, 2017; U.S. Appl. No. 14/962,259.

Non-Final Office Action dated Feb. 27, 2017; U.S. Appl. No. 14/962,249.

Notice of Allowance dated Jul. 11, 2018 for U.S. Appl. No. 14/962,259 (19 pages).

Non-Final Office Action dated Feb. 5, 2018 for U.S. Appl. No. 14/962,259 (41 pages).

* cited by examiner

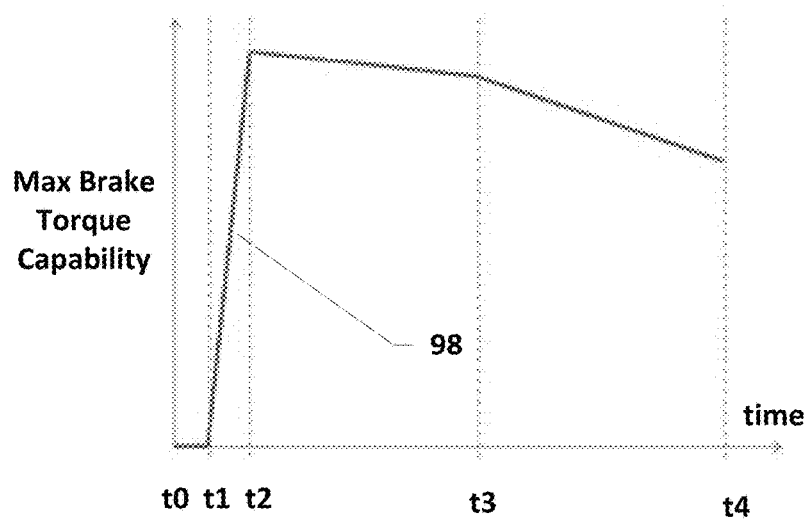

FIG. 13A t0 - t1 = delay in responding to request
t1 – t2 = ramp up from current brake to full brake effort
t2 – t3 = reduced braking due to pitching of vehicle
t3 – t4 = reduced braking due to brake fade

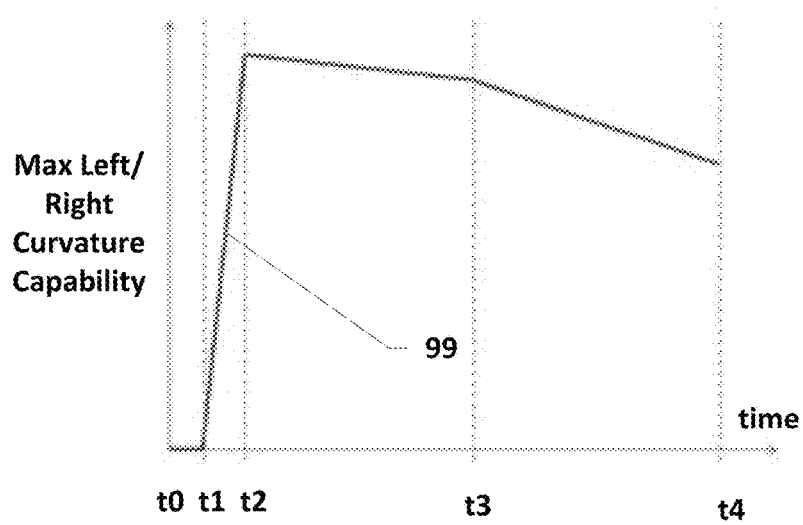

FIG. 13B t0 - t1 = delay in responding to request
t1 – t2 = ramp up from current curvature to full curvature based on max rate signal
t2 – t3 = reduced curvature due to understeer/oversteer of vehicle
t3 – t4 = reduced curvature due to roll of vehicle

VEHICLE CURVATURE DETERMINATION

BACKGROUND

Freeway and highway systems provide a network of controlled-access roads that deploy on-ramps and off-ramps for merging onto and egressing from roadway. However, traffic congestion, especially on highways and freeways, has become a bottleneck for commuters and travelers. Roadways use has gone well above its intended vehicle capacity. Mechanisms are therefore needed to facilitate driving on public roads to increase traffic efficiency, reduce congestion, reduce risk of collisions, etc.

BRIEF DESCRIPTION OF THE DRAWINGS

FIG. 13A is an exemplary illustration of a predicted maximum brake torque capability response of a vehicle.

FIG. 13B is an exemplary illustration of predicted curvature response limits of a vehicle.

DETAILED DESCRIPTION

Introduction

Figure 2:
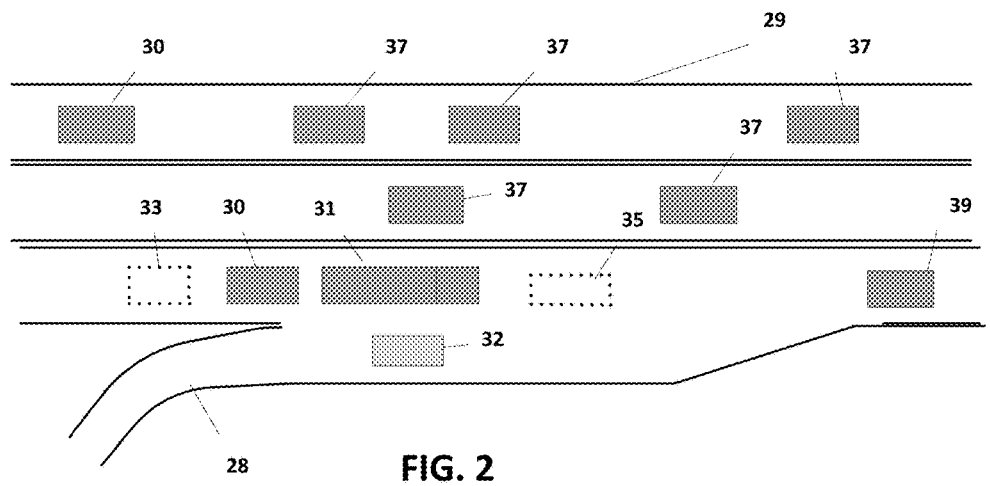
FIG. 2 is an illustration of a freeway entrance ramp with a merging vehicle.

Merging onto a freeway, deaccelerating and egressing the freeway and making quick maneuvers around an obstacle represent difficult scenarios for autonomous or non-autonomous vehicles. An illustration of an exemplary entrance ramp scenario is shown in FIG. 2, in which a vehicle 32 is positioned on an entrance ramp 28 (merging lane) of a roadway 29. A vehicle 32 with a simplified powertrain model would typically choose to slow down and possibly come to a complete stop and wait to merge into a slot 33 behind a car 30. However, when the roadway 29 is highly congested, a slot 33 accessible by a vehicle 32 using a conservative powertrain model may not present itself in a timely manner. The vehicle 32 system 10 disclosed herein provides knowledge of acceleration capabilities of the vehicle 32 to facilitate merging into a slot that is timely available, such as slot 35 in front of a truck 31 and behind a car 39. In other words, a virtual driver, e.g., one or more computers executing programming to control some or all vehicle 32 operations, of the vehicle 32 can determine that the vehicle 32 has sufficient acceleration capability to safely merge the vehicle 32 into slot 35.

Figure 3:
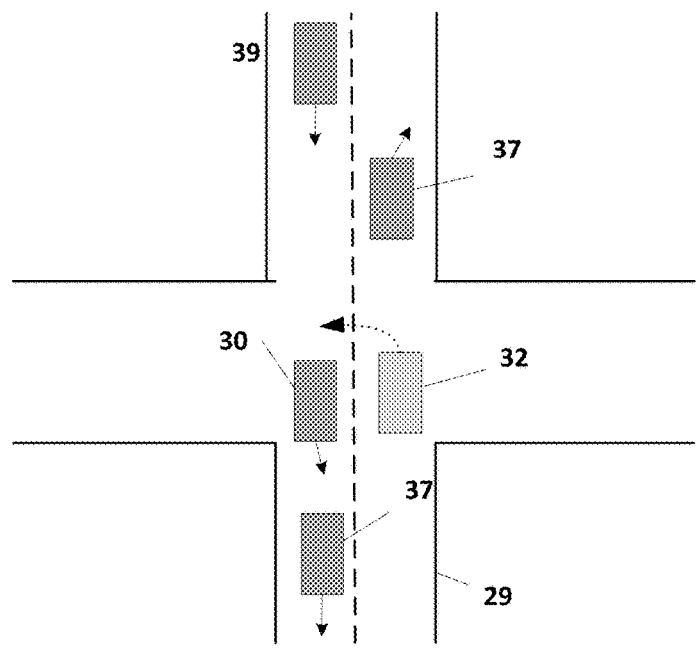
FIG. 3 is an illustration of a vehicle making a left-turn across busy traffic.
Figure 4:
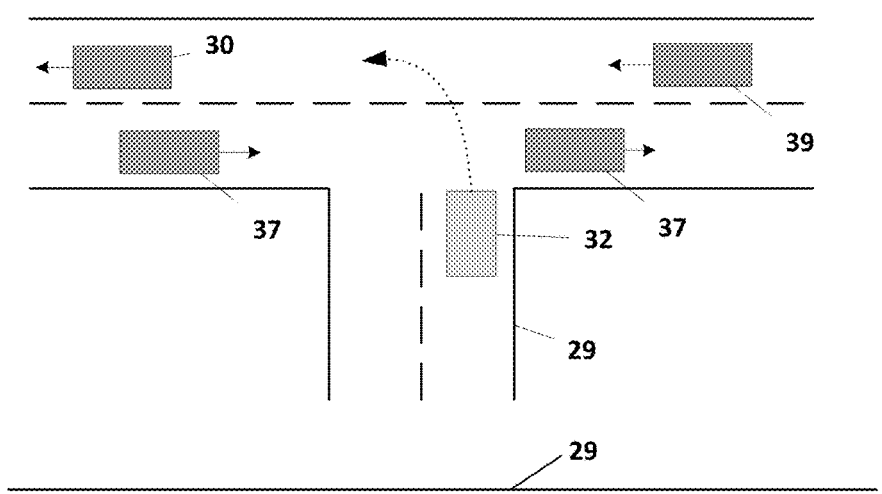
FIG. 4 is an illustration of a vehicle making a left-turn across busy traffic and merging into a busy lane of traffic.
Figure 5:
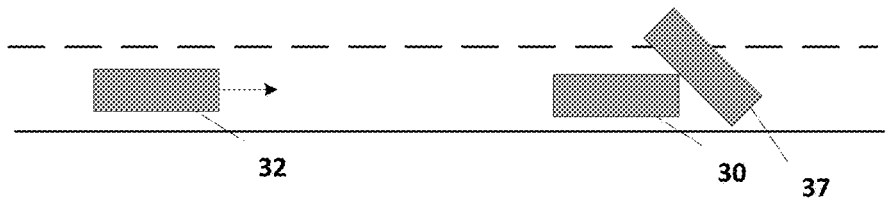
FIG. 5 is an illustration of a vehicle approaching other vehicles which are blocking the autonomous vehicle's lane of traffic.

FIG. 3 shows another exemplary scenario in which the vehicle 32 is attempting to complete a left turn across busy traffic between the car 30 and the car 39. FIG. 4 shows a similar left-turn across traffic, but in this case the vehicle 32 is also merging into traffic between car 30 and car 39. FIG. 5 shows the vehicle 32 approaching the cars 30, 37, in which the path of the vehicle 32 is blocked. The vehicle 32 must either decelerate before the cars 30, 37, and/or the vehicle 32 must maneuver about the cars 30, 37. As with the exemplary scenario discussed above and shown in the figures, the virtual driver of the vehicle 32 can use knowledge of the vehicle longitudinal and lateral performance capability of the vehicle 32 in order to determine whether the vehicle 32 can safely perform any desired maneuver.

Glossary

Certain words and terms used in this document will be recognized by those skilled in the art and are intended to be accorded their plain and ordinary meanings. Further, to facilitate explanation of the disclosed subject matter, the following terms as used in this document have meanings as set forth in the following paragraphs:

Profile—when herein used in the context of a physical quantity, e.g., "torque profile," refers to a set of values, e.g., that may be plotted on a graph, of the physical quantity, each of the values pertaining to a moment in time, e.g., having a time index.

Acceleration profile—is a rate of change of velocity of a vehicle over a period of time. For example, the acceleration capability profile can be a derived from a combination of the characteristics of the vehicle's engine, transmission, hybrid motors and battery state of charge operating at their maximum capacity along with the vehicle mass and external factors like road grade.

Desired acceleration profile—is a plan of vehicle acceleration to be executed by an autonomous or semi-autonomous vehicle. It can be determined from a map stored in a computer memory, a desired route to follow, a maximum acceleration capability of the vehicle, a communication from another vehicle, a communication from an external road infrastructure system and an obstacle detection sensor.

Desired minimum acceleration profile—is a plan of vehicle deceleration to be executed by an autonomous or semi-autonomous vehicle. It can be determined from a map stored in a computer memory, a desired route to follow, a minimum acceleration capability of the vehicle, a communication from another vehicle, a communication from an external road infrastructure system and an obstacle detection sensor.

Desired curvature profile—is a plan of vehicle left and right maneuvers to be executed by an autonomous or semi-autonomous vehicle. It can be determined from a map stored in a computer memory, a desired route to follow, a maximum curvature capability of the vehicle, a communication from another vehicle, a communication from an external road infrastructure system and an obstacle detection sensor.

Powertrain torque—the torque delivered to the wheels of the vehicle, i.e., the vehicle's total torque minus any torque to drive pumps for hydraulic systems and power any engine accessories.

Velocity profile—is the calculated velocity of the vehicle over a time period and may be obtained by integrating the acceleration profile.

Distance profile—is the calculated distance for a time period and may be obtained by determining a second integral of the acceleration profile.

Torque profile—is a plot of torque over a fixed time period.

Acceleration rate limit—refers to a restriction or a vehicle's acceleration capability.

Wheel torque limiting factors—limits to wheel torque and/or torque changes. For example, torque is reduced to soften automatic transmission shift changes when the transmission shifts gears. Another example of a torque limiting factor is a transmission torque limiter, which is a device that protects the engine and drivetrain from damage by mechanical overload.

Maximum wheel torque—is the maximum torque available at the vehicle wheels. This torque value is the sum of all the factors that reduce torque at the wheels subtracted from the maximum torque the powertrain can produce. For example, factors that reduce torque can be any mechanical loss in the gears of the vehicle due to friction and churning.

Transient torque—the changing values of torque as more or less power is applied to a vehicle. For example, when the vehicle accelerates from a standstill with the maximum accelerator pedal, the torque increases until the vehicle's engine power output is at its maximum and/or until an equilibrium is obtained.

Steady state torque—occurs when the torque developed by the powertrain equals the desired torque within the limits of the system capability.

Motor torque limit value—is the maximum amount of torque a motor can deliver.

Torque balance distribution—is the values of the disseminated torque at each wheel which can be adjusted to compensate for road and driving conditions.

System power limit value—is the absolute system power determined by the wheel torque limiting factors, the engine power and a battery power limit (if a hybrid vehicle).

Gear churning—is the drag torque due to the rotation of discs submerged in a fluid, such as transmission gears in a transmission fluid.

Transient region—is the region of a plot where the acceleration is changing quickly, e.g., prior and up to reaching a steady-state region.

Steady state region—is the region of a plot where the response is changing slowly, limited by longer term physical capabilities of the powertrain (e.g. battery power limits).

Max curvature—the minimum radius a vehicle can turn while maintaining the lateral stability of a vehicle, which may take into account passenger comfort.

Road wheel angle—an angular measure of one or more wheels relative to the longitudinal axis of the vehicle.

Path radius—the radius of an arc for the vehicle to navigate a path.

Left/Right capability—the vehicle's ability to execute and recover from a maneuver from one direction to another, for example, a lane change or an s-turn. The capability takes into account oversteer and understeer, road conditions, tire conditions and weather conditions, just to name a few.

Curvature—the radius of a path of a vehicle.

Current curvature—the current radius of a vehicle path.

Steering system capability model—a model of the steering which can include an asymmetric left to right change value, a maximum rate of change of curvature and data from a suspension sensor.

Vehicle dynamic capability model—a model of the vehicle dynamic capability which can include a ground reaction load at steer axle value, a bank, a surface mu, a CAN signal loss, a CAN signal corruption, a power supply level and a tire saturation.

Maximum rate of change of curvature—the maximum rate a vehicle can change its curvature (turning radius) while maintaining the lateral stability of a vehicle, further possibly taking into account passenger comfort.

Asymmetric left to right change value—the asymmetric performance of vehicle curvature when increasing the current direction bias versus decreasing the current direction bias.

Capability of lateral movement—the vehicle's ability to maneuver to either the right or to the left in a set time period at the vehicle's current speed. For example, the vehicle's ability to change lanes while traveling at fifty-five mile per hour.

Basic system sizing—the mechanical characteristics of the vehicle. For example, the characteristics can include a vehicle mass (including passengers and cargo), a length, a width and a depth of the vehicle, and the similar characteristics of any vehicles being towed.

Suspension geometry—specifies the structure and relationships of suspension components, for example the connection to knuckles and other suspension components.

Understeer/oversteer gradient—is a coefficient of the understeer/oversteer when the vehicle is executing a turn as a function of a lateral acceleration value.

Ground reaction load at steer axle—road load affecting the steering system statically or dynamically.

Road grade—a physical feature of the road that refers to the tangent of the angle of that road surface to the horizontal.

Bank—lateral as opposed to longitudinal inclination of the roadway, e.g., that either tilts the vehicle into or away from the center of radius of curvature, typically measured in degrees.

Surface mu—coefficient of friction for the cumulative effects (snow, ice, water, loose material) and the texture of the road surface.

Split friction mu—is a road condition that occurs when the friction significantly differs between the left and the right wheel path.

Componentry status—the collective status of the sensors, the controllers and systems within a vehicle.

Controller area network (CAN) signal loss—missing signals on the CAN bus.

Controller area network (CAN) signal corruption—invalid signals on the CAN bus.

Power supply level—a present status of the voltage and current draw capability at the controller connector derived from the any of the vehicle's power sources, i.e., the combination of the battery and alternator.

Tire saturation value—a point where a tire is unable to generate additional lateral or longitudinal forces.

Vehicle mass—can include passengers, payload and towing.

Minimum acceleration capability—a change in velocity over time of a vehicle in the decreasing direction.

Maximum acceleration capability—the maximum rate of change of velocity of a vehicle in the increasing direction.

Brake pad mu—scalar value which describes the ratio of the force of friction between the brakes and the rotor or drum when activated. Temperature, wear, water, oil and other factors can affect brake pad mu.

Vehicle pitch during dynamic braking—a longitudinal weight transfer when braking, i.e., loading of the front axle and unloading of the rear axle.

Load distribution—the distribution of the weight of the passengers, cargo, trailer tow weight and the vehicle itself that determines individual normal wheel forces.

Pressure distribution—the distribution of hydraulic brake fluid pressure at either an axle or an individual wheel.

Regenerative braking feedback value—a net effect of the regenerative braking system on a vehicle braking performance. It is affected by generator sizing, battery state of charge, temperature, rate of minimum acceleration and other factors. These will affect what is the portion of the minimum acceleration that is captured regen energy or frictional brake heat. The blending of the two effects the overall stopping performance.

Active control feedback—a net effect of the driving assist systems which have an influence on stopping, e.g., ABS and stability control have a direct effect on an individual stop, but are also indications for more conservative driving habits may be required.

Wheel speed sensors—sensors which can detect relative slip of tires by measuring individual wheel speeds.

Inertial sensor—a navigation aid that uses a computer, motion sensors (accelerometers) and rotation sensors (gyroscopes) to continuously calculate via dead reckoning the position, orientation, and velocity (direction and speed of movement) of a vehicle without the need for external references.

System Overview

Figure 1:
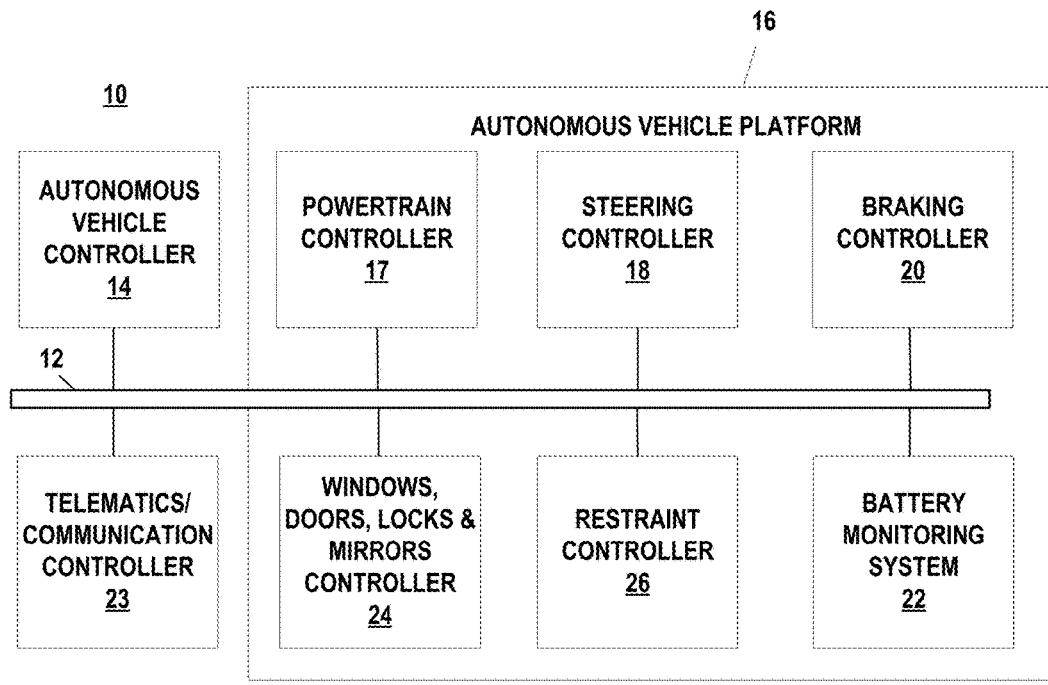
FIG. 1 is a block diagram of an exemplary automated vehicle control system.

In the Figures, like numerals indicate like elements throughout the several views. FIG. 1 shows an exemplary autonomous vehicle control system 10. The system 10 can include a plurality of electronic control units (ECUs) communicatively coupled to a controller area network (CAN) bus 12, e.g., in a known arrangement. One such ECU coupled to the CAN bus 12 is an autonomous vehicle controller (AVC) 14. The AVC 14 is a supervisory ECU that plans, coordinates and executes vehicle 32 excursions and maneuvers. The AVC 14 is in communication with various ECUs which send data from various sensors and systems. For example, the AVC 14 can send and receive real time communications and data from several of the vehicle 32 ECUs known collectively as an autonomous vehicle platform (AVP) 16. The AVP 16 can include a powertrain controller 17, a steering controller 18 and a braking controller 20, a battery monitoring system ECU 22, a windows, doors, locks and mirrors controller 24, and a restraint controller 26. In addition, the AVC 14 can request and receive real time environmental and road conditions via a telematics controller 22.

The aforementioned controllers are also communicatively coupled to the CAN bus 12, e.g., in a known manner, in the example system 10. As is known, a vehicle controller, such as for systems or controllers mentioned above, typically contains a processor and a memory, each memory storing instructions executable by the respective processor of the controller. Each controller memory may also store various data, e.g., data collected from other controllers or sensors in the vehicle 32, such as may be available over the CAN bus 12, parameters for operations of the controller, etc.

Autonomous Vehicle Controller

As the supervisory control controller, the AVC 14 provides overall control of planning and operations of the autonomous vehicle 32. The AVC 14 collects and evaluates pertinent data from the aforementioned controllers and sensors and monitors the status of the vehicle 32. For example, the AVC 14 can communicate with the ECUs to ascertain the current state of the vehicle 32, including internal vehicle states and/or environmental conditions. For example, the internal vehicle state can include: a battery state of charge, a vehicle speed, an engine speed, an engine temperature, a motor temperature, a battery temperature, a list of failure modes, etc. The environmental conditions can include, for example, an atmospheric pressure, an atmospheric temperature, a road grade, a road surface condition, etc.

Additionally, the AVC 14 can receive information from a GPS receiver, a set of road map data, a set of hybrid powertrain data, weather data and a forward determination sensor i.e., a LIDAR sensor, a SONAR sensor, an optical range determination system, etc., e.g., via the CAN bus 12 in order to make a path of travel determination. To determine a path of travel, the AVC can include, for example, a set of possible future routes, a vehicle acceleration capability, a vehicle minimum acceleration capability, a vehicle lateral maneuvering capability, etc.

The AVC in typical driver assisted vehicles and self-driving, i.e., autonomous vehicles, such as the vehicle 32 of FIG. 2, typically have simplified models of the AVP system capability. This is in part due to limitations in the amount of information we can transferred over the CAN bus to the AVC 14. The AVC 14, and all of the other ECUs on the CAN bus 12 may only be able to exchange a subset, i.e., less than all, of the desirable AVP 16 information and/or other information available over the CAN bus 12 due to a volume of controller and ECU communications traffic traversing the CAN bus 12. As a result, the AVC 14 typically takes a conservative approach when planning a merge onto a highway, making turns across traffic or even leaving a highway, just to name a few possible vehicle 32 maneuvers. This conservatism in path selection and control can result in the vehicle seeming sluggish and less refined. This could be prevented if the ECUs of the AVP 16 could provide timely, high fidelity vehicle capability information to assist the AVC 14 with its path planning.

Autonomous Vehicle Platform

The ECUs of the AVP 16 have access to much more information about the various subsystems (powertrain, brakes, steering) of the AVP than could be made available over CAN bus 12 to the AVC 14. As a result, these ECUs can produce much higher fidelity models of their specific subsystems capabilities in light of the current operating conditions, both internal and external. The AVP can then use these models to predict the true capability of the vehicle 32, effectively condensing the multitude of factors down to profiles of system capability that is pertinent to lateral and longitudinal path planning control. For example, the AVP 16 can determine the maximum available torque profile, which can be used to calculate an associated acceleration capability profile of the vehicle 32. In addition, the AVP 16 can provide a steering or curvature performance profile and a braking profile of the vehicle 32. By providing higher fidelity estimates of the system acceleration, minimum acceleration and steering capabilities from the AVP 16 to the AVC 14, the AVC 14 can be less conservative in its path planning and control of the vehicle 32.

Braking Controller

The braking controller 20 can monitor and control the vehicle 32 brakes, as well as any parameters affecting the stopping of the vehicle 32. The braking controller 20, for example, can assess and determine a minimum acceleration capability of the vehicle 32 by constantly requesting and/or receiving data related to minimum acceleration from various vehicle 32 components and systems. The maximum brake torque capability can be used to generate a braking profile, which can be sent to the AVC 14 for determining how to decelerate the vehicle 32. The braking profile can include the maximum brake torque capability along with a minimum acceleration capability.

Referring to FIG. 13A, an exemplary plot of a maximum brake torque capability of a vehicle is shown. A maximum brake torque 98 is plotted over an exemplary time period t0 to t5. The time interval indexed between t0 to t1 represents a delay in the braking controller 20 responding to a breaking request and no breaking torque is being applied to the vehicle. The time from t1-t2 is the ramping up of the maximum brake torque 98 from of the current braking torque value to a full breaking torque value and is based upon a maximum rate of possible change as determined by the braking controller 20. From time t2-t3 the maximum brake torque 98 is reduced, for example due to the pitching motion of the vehicle 32 as it is slowing. In the time frame t3-t4, the maximum brake torque 98 reduces even further due to brake fade. Brake fade is a term used to describe the partial or total loss of braking power used in a vehicle brake system. Brake fade occurs when the brake pad and the brake rotor no longer generate sufficient mutual friction to stop the vehicle at its preferred rate of deceleration.

The maximum brake torque capability is determined from such factors as a brake pad status, a hydraulic pressure status, a size of the vehicle 32, e.g., the vehicle 32 mass along with a vehicle payload and a towed object mass, if any. Additional factors can include one or more of a road grade value (slope), a road surface mu, a split friction mu, a brake pad mu, a pitch angle of the vehicle 32, a load distribution of the vehicle 32, a hydraulic brake pressure distribution of the hydraulic brake fluid. Additionally, the braking controller can detect an abnormality on the brake pads and adjust the maximum brake torque capability. For example, a groove in the brake pad or a liquid, e.g., water or oil on the brake pad or even a contaminant on the brake pad e.g., sand or dirt will affect the maximum brake torque capability.

The braking controller 20 can also monitor the vehicle 32 regenerative braking interactions and evaluate how the regenerative braking affects the minimum acceleration of the vehicle 32. A regenerative brake, as is known, is an energy recovery mechanism which decelerates a vehicle by converting its kinetic energy into another form, such electrical energy, which can be either used immediately or stored until needed. For example, when the vehicle 32 is slowing, generators in the wheels can be generating electricity and storing the energy in the vehicle 32 battery without the brake pads coming into contact with the wheels.

The braking controller 20 can also monitor the vehicle 32 active controller status. For example, an anti-lock braking system (ABS) status. ABS is a vehicle safety system that allows the wheels to maintain tractive contact with the road surface according to driver inputs while braking, preventing the wheels from locking up (ceasing rotation) and avoiding uncontrolled skidding. Another example of an active control function is traction control. Traction control is a vehicle system which reduces power to a wheel when torque is mismatched to road surface conditions, e.g., when the wheels slipping.

Additionally, the braking controller 20 can monitor a componentry status of the braking system for problems with any its components. For example, the braking controller 20 can determine how a defective hydraulic proportioning valve component is going to affect the maximum brake torque capability of the vehicle 32 and then send a message to the AVC 14, alerting the vehicle of a possible diminished stopping capability.

The braking controller 20 can use a vehicle sensor, for example, a wheel speed sensor (not shown) and an accelerometer (not shown) with forward looking information to assist the AVC 14 with planning a deceleration. The forward looking information can be obtained from a map stored in the memory and can include, for example, road grade, elevation changes, road bank information collected information from previous excursions, just to name a few. In addition, the vehicle 32 can obtain forward looking information via a download from a vehicle-to-infrastructure (V2I) database (not shown) via the vehicle 32 telematics unit 23. The forward looking information can also be downloaded from a vehicle-to-vehicle (V2V) exchange.

Steering Controller

The steering controller 18 can monitor and control the steering system of the vehicle 32. The steering controller 18 can generate one or more curvature limit profiles which can be sent to the AVC 14 for use when determining steering maneuvers. A first profile could provide curvature limits for a right-turn path, and a second profile could provide curvature limits for a left-turn path. Alternatively a limit profile could include a single series of limit data generated for both left and right turns to describe not simply a curvature limit at a point in time but a maximum rate at which curvature is allowed to change for both left and right turns. Yet, further, a limit profile could include first and second series of data that respectively incorporate curvature limits for left and right turn paths, as well as maximum curvature change rates, such combination of curvature limits and maximum change rates being dependent on various factors including a rate at which data can be obtained. Put another way, the vehicle path curvature limits can be expressed as a profile that one of (a) includes a first series of curvatures for left turns and a second series of curvatures for right turns, (b) includes each of a curvature that is a limit for both left and right turns, a left turn path curvature rate, and a right turn path curvature rate, and (c) includes a combination of a series of left and right path curvatures and curvature rates.

For example, a profile including curvature limits can be produced from such elements as a lateral acceleration of the vehicle 32, a road wheel angle, a steering wheel angle, a yaw rate, a path radius, a right and a left (lateral) maneuver capability, a maximum rate of change of curvature the vehicle can execute and a lateral asymmetry. The lateral asymmetry is an asymmetric difference in the vehicle's ability to perform a left maneuver as opposed to a right maneuver. Additionally or alternatively, the maximum curvature profile can also comprise, for example, a size of the vehicle 32, a ground reaction load at the steering axle, a bank angle, a road surface coefficient value and a suspension geometry, etc.

The steering controller 18 can also monitor the steering system for problems with any its components. Once the steering controller 18 determines that a component may be faulty and is not performing as expected, the steering controller further determines how the turning capabilities of the vehicle 32 are diminished. The steering controller 18 can then send a message to the AVC 14 alerting the vehicle of a diminished turning capability.

The steering controller 18 working with the AVC 14 can also use the vehicle sensors, for example, the wheel speed sensors, the accelerometer and the inertial sensor with forward-looking information to determine if the maximum curvature profile of the vehicle 32 will be appropriate for the upcoming road conditions. For example, an accident in the road requires that the vehicle 32 equipped with a trailer make a turn with a ten meter radius turn to get around the accident. The maximum curvature profile indicates the vehicle with the trailer may only be able to manage a 12 meter turn radius, in which case the AVC 14 would have to determine an alternative route. The forward-looking information can be obtained from a map stored in the memory and can include, for example, road grade, elevation changes, road bank information collected information from previous excursions, just to name a few. In addition, the vehicle 32 can obtain forward looking information via a download from a vehicle-to-infrastructure (V2I) database (not shown) via the vehicle 32 telematics unit 23. In addition, the forward-looking information can also be downloaded from a vehicle-to-vehicle communications system, e.g., from another vehicle.

Powertrain Controller

The powertrain controller 17 can monitor and control the powertrain system of the vehicle 32. It can calculate torque values based on high fidelity static and dynamic models of the powertrain system using data received at the sensors and the internal states of the system. For example, the powertrain controller 17 can monitor the high voltage battery and high voltage battery system of the vehicle 32 to determine how much of the high voltage battery capacity is available to assist with torque generation at the vehicle's motors. Additionally, the powertrain controller 17 can monitor and regulate the combustion engine torque contribution accounting for the effect of internal factors (failure modes, engine temperature, rate of change and range of actuators like throttle, variable cam, etc.) and external factors (altitude, atmospheric temperature, humidity, etc.). These torque capability estimates can then be converted to an equivalent acceleration capability estimates using vehicle mass, road grade, tire radius, and the road surface coefficient of friction.

Other Systems

The battery monitoring system ECU 22 is responsible for monitoring and maintaining the high voltage (HV) battery of the autonomous vehicle 32. The battery monitoring system ECU 22 sends information regarding the state of charge of the hybrid HV battery system. The windows, doors, locks and mirrors ECU 24 monitors and controls the windows, doors, locks and mirrors of the autonomous vehicle 32. The restraint controller ECU is responsible for the vehicle 32 safety equipment, such as air bags, seat belt tensioners and any other passenger protection systems.

Modeling Maximum Acceleration Capability as Distance and Speed Profiles

To safely make a merge or a turn, some considerations involved in the calculus can include a distance to be traversed as well as any changes in velocity that would be required to execute the maneuver. Referring back to FIG. 2, the vehicle 32, e.g., the AVC 14, will need to determine that the vehicle 32 can safely traverse a required distance in an appropriate time to get into the slot 35 or alternatively, merge into the slot 33 taking into account the speed of the traffic flow on the roadway 29. When both conditions can be determined and met, the vehicle 32 can then proceed and accelerate to merge into the slot 33. In other words, the vehicle 32 will have to conclude that the vehicle 32 is fast enough and can generate enough torque to safely maneuver into the slot 35, or alternatively, slot 33.

A velocity profile and a distance profile of the vehicle 32 can be determined if an acceleration profile of the vehicle 32 is available, i.e., by integrating the acceleration profile to produce the velocity profile and subsequently integrating the velocity profile to create the distance profile.

Figure 6:
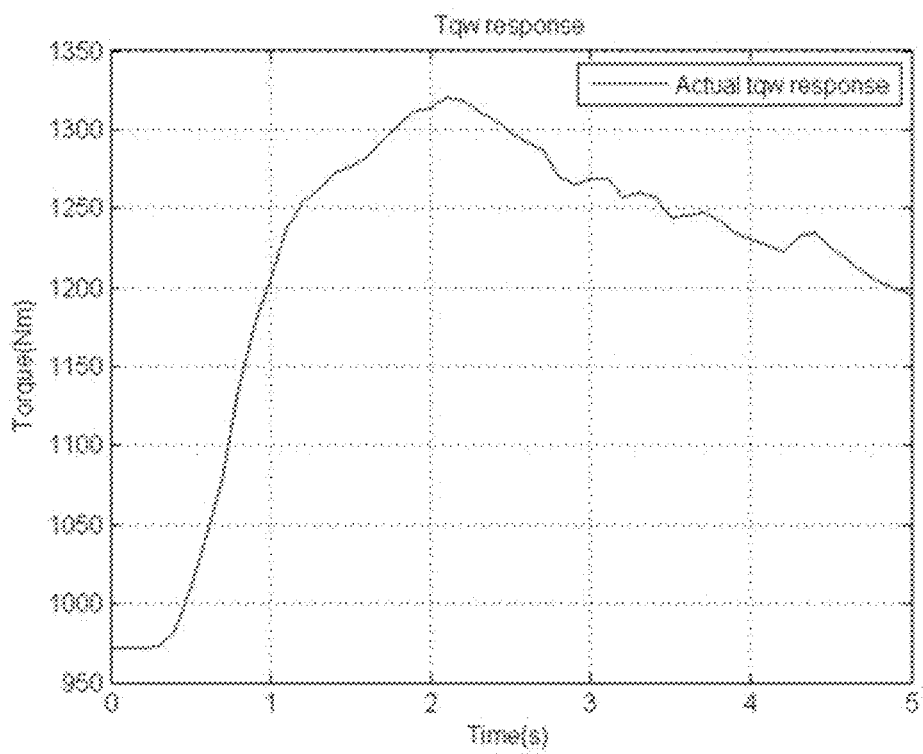
FIG. 6 illustrates an exemplary torque profile of a hybrid electric vehicle (HEV) for a five second interval.
Figure 7:
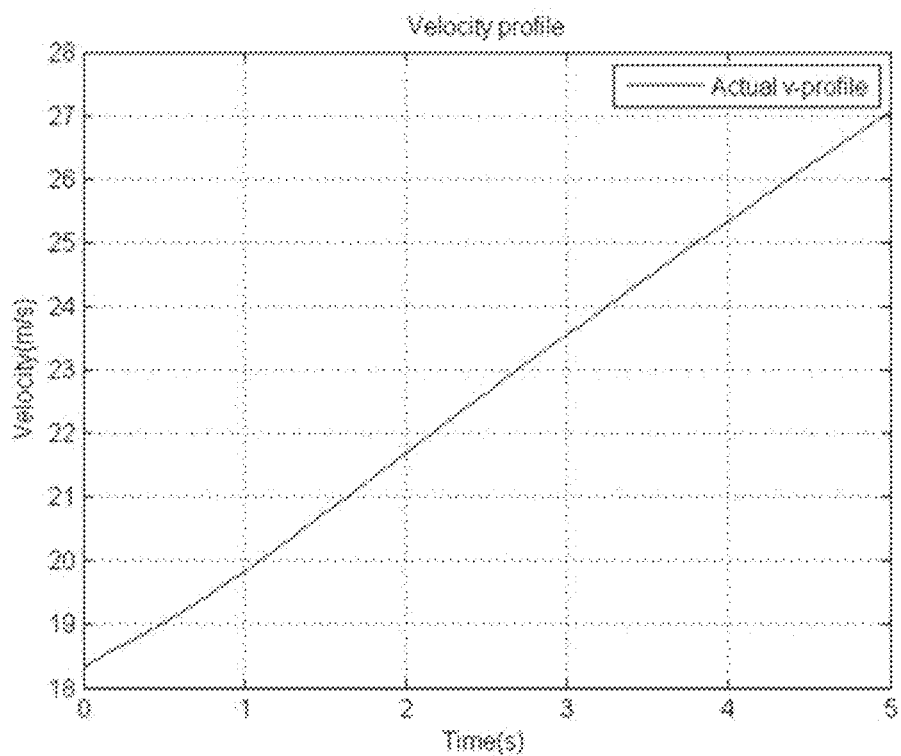
FIG. 7 illustrates an exemplary velocity profile of the HEV of FIG. 6 for the five second interval.
Figure 8:
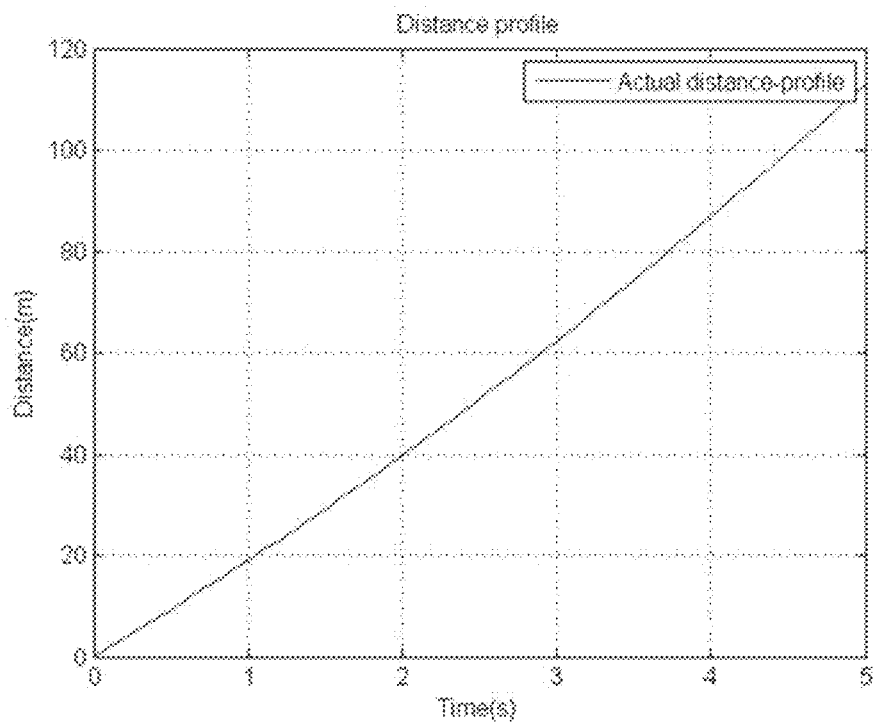
FIG. 8 illustrates an exemplary distance profile of the HEV of FIG. 6 for the five second interval.

FIG. 6 illustrates an exemplary wheel torque profile of a hybrid electric vehicle 32 over five seconds, where at time zero the vehicle 32 is stopped and may be idling. Given the road grade, vehicle mass and a wheel radius, one can generate an equivalent acceleration profile. FIGS. 7 and 8 show the corresponding velocity profile and distance profiles derived from the wheel torque profile of FIG. 6. For instance, if the AVC 14 obtains the torque profile for a five second interval, the AVC 14 can ascertain the corresponding velocity profile of the vehicle 32 over the five seconds. The AVC 14 can typically also ascertain the vehicle 32 distances within the same five seconds. For example, with reference to FIGS. 6-8, at a time index of one second, the maximum wheel torque (vertical axis) being delivered to the powertrain is approximately 1200 Newton-meters. The velocity produced in the transient region at one second (horizontal axis) would be approximately 19.8 meters per second (vertical axis) and the distance traveled would be approximately 19 meters (vertical axis). At time equals four seconds, the steady state torque would be approximately 230 Newton-meters, the velocity would be approximately 25.3 meters per second, and the distance traveled would be approximately 86 meters.

Figure 9A:
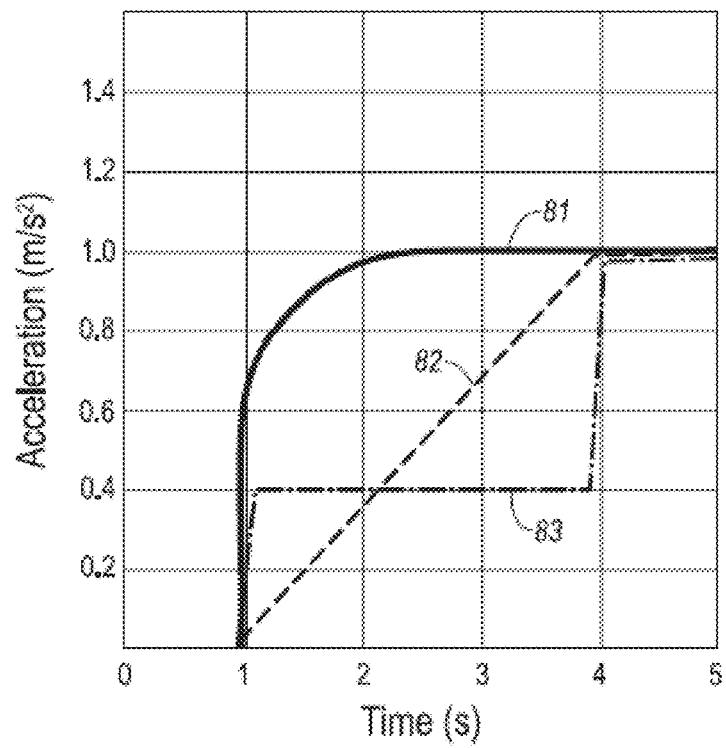
FIG. 9A is an illustration of an exemplary plot of three different vehicles transient torque acceleration profiles.
Figure 9B:
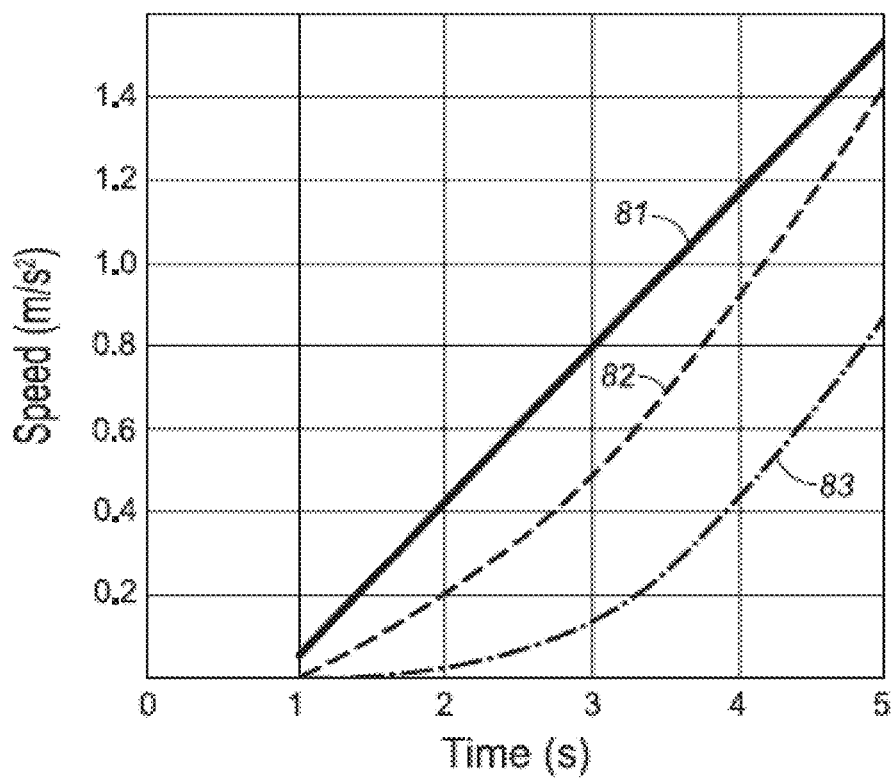
FIG. 9B is an illustration of an exemplary plot of three different vehicles transient velocity profiles.
Figure 9C:
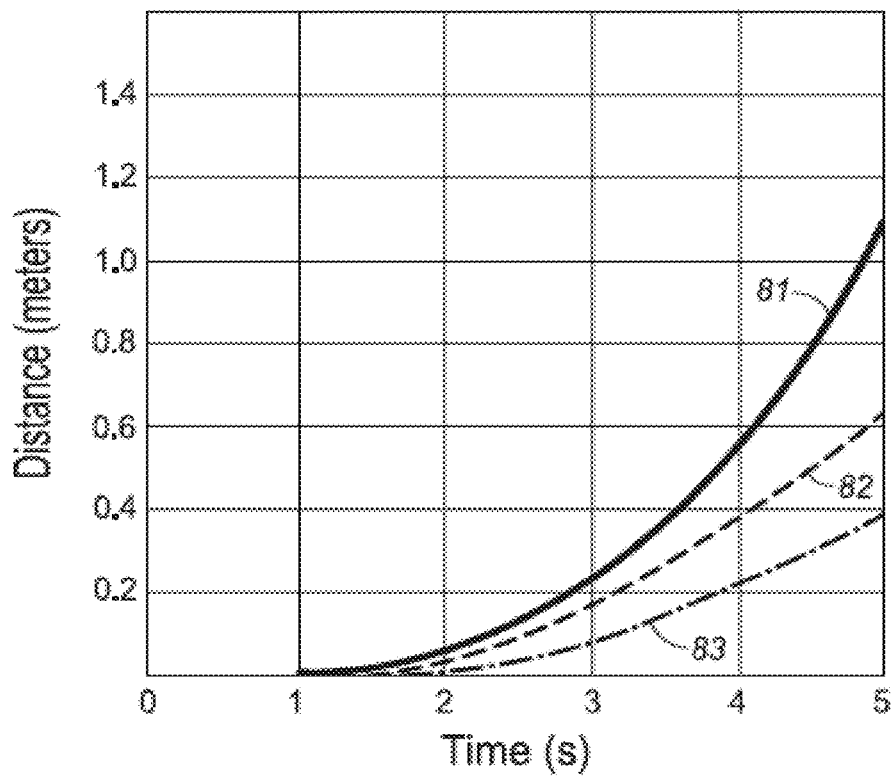
FIG. 9C is an illustration of an exemplary plot of three different vehicles transient distance profiles.

The plots of FIGS. 9A, 9B, and 9C illustrate profiles of three transient accelerations of three different vehicles (or the same vehicle under different conditions). A first vehicle 81 has a first order filter response for acceleration. A second vehicle 82 starts with a straight line acceleration which then flattens out. A third vehicle 83 begins with a rapid acceleration increase which then flattens out and then increases again. All three acceleration profiles have the same final steady state acceleration at a time index of five seconds. However, as illustrated in FIGS. 9B and 9C, the resulting velocities and distances travelled, respectively, over the five seconds are significantly different. Therefore, as each vehicle's acceleration profile differs, the calculation of the each particular vehicle's velocities and distances are also differ which could significantly impact the most appropriate path to select for an autonomous vehicle. Therefore, using real time vehicle performance capability data is crucial for path planning of the vehicle 32 and must be taken into account when determining the vehicle's merging capabilities.

Typical Maximum Vehicle Acceleration Response

A typical maximum pedal response and the corresponding acceleration profile varies depending on the type of engines, motors and the powertrain, e.g., the performance characteristics of a battery electric vehicle (BEV) are different than those of a hybrid electric vehicle (HEV) or even of a gas or a gas turbo vehicle. For example, when determining the maximum capability of the system, the AVP can take into consideration a current gear ratio between the engine/motor and the wheels, a driver selectable mode, a vehicle calibration, any drivability filters, an engine On/Off state, gear ratios between the engine/motor and the wheels, etc. Common performance considerations for a hybrid vehicle and other vehicles when considering the maximum propulsive capability characteristics include whether the vehicle is moving or at a standstill, the size of the engine, the current transmission gear and calibrations, just to name a few.

Figure 10A:
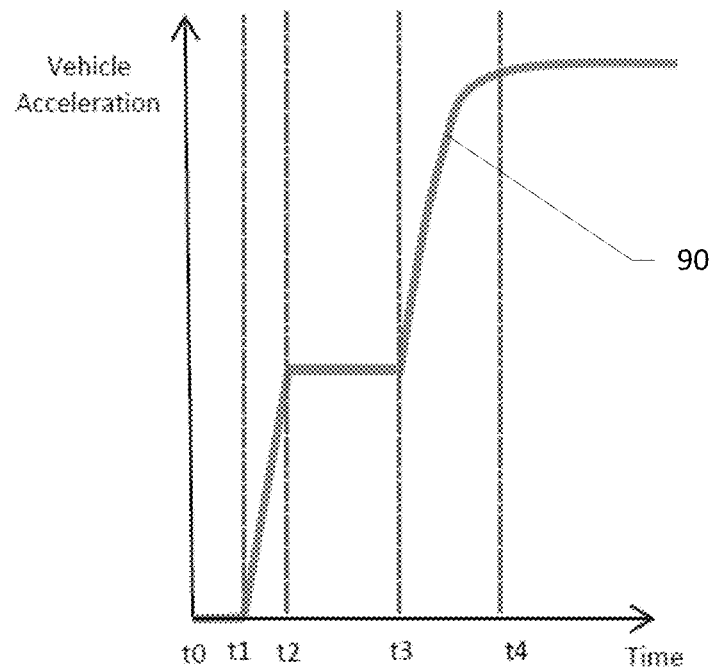
FIG. 10A is an exemplary illustration of an HEV acceleration response over a time period.

FIG. 10A is an illustration of an exemplary acceleration plot 90 of the response of a hybrid electric vehicle. The time interval from t0 to t1 of the plot 90 represents a delay due to the time it takes for the system to recognize a change in a torque request (e.g., from input to an acceleration pedal) and initiating a response from the actuators. The initial rise from t1 to t2 reflects the fast torque response provided via the electric motor. The time from t2 to t3 represents a decrease in acceleration (slope) as the HEV engages the combustion engine. During the time from t3 to t4, the acceleration rate increases again as the combustion engine contributes to the overall wheel torque and the vehicle's acceleration.

Figure 10B:
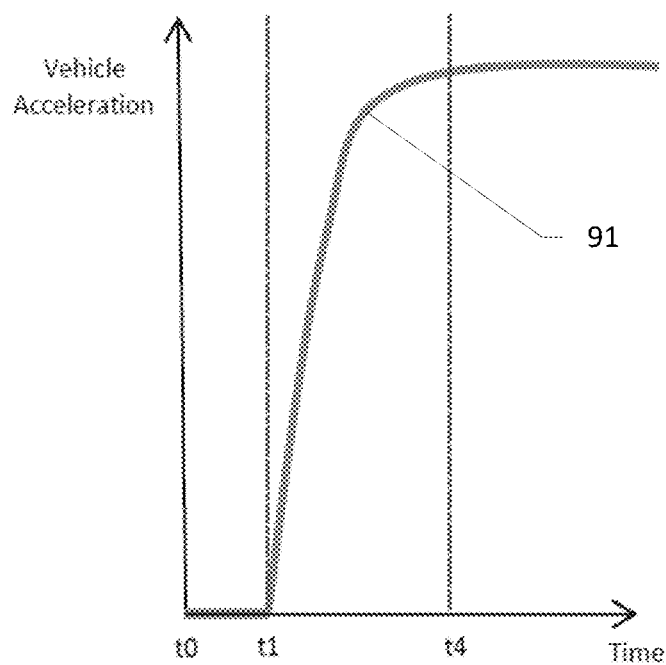
FIG. 10B is an exemplary illustration of a naturally aspirated engine's acceleration response over a time period.

FIG. 10B is an illustration of an exemplary acceleration plot 91 of the response of a naturally aspirated combustion engine. As in the case of the HEV discussed above, the time delay from indexes t0 to t1 of an aspirated plot is due to the request and the initiation of the response from the actuators. As compared to the HEV example in FIG. 10A, the initial delay will likely be longer due to the gasoline engine's actuators, as they are characteristically sluggish to respond compared to the electric motor in a HEV. In the time period from indexes t1 to t4, the acceleration rate increases similarly to that of a first order filter as the manifold fills with air and the engine cylinders ingest more air, which allows the engine to create more torque and vehicle acceleration.

Figure 11:
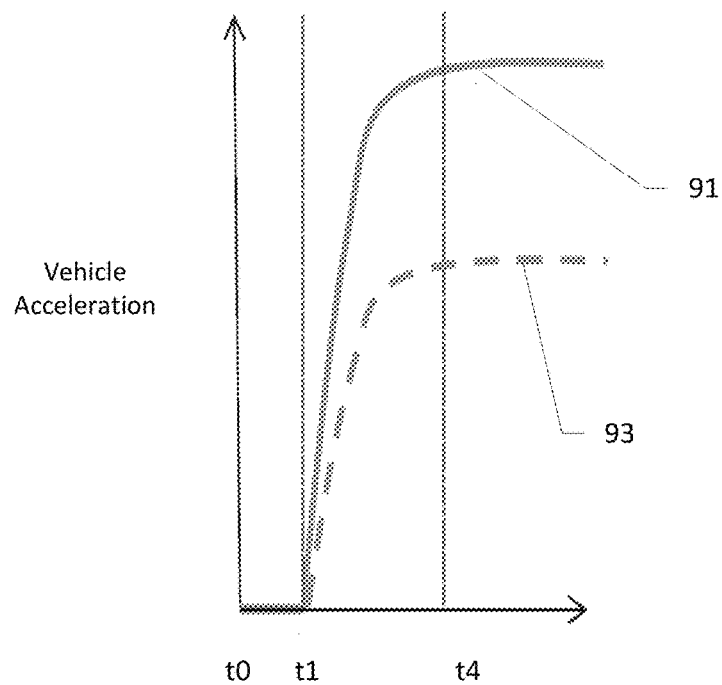
FIG. 11 is an exemplary illustration of a plot of a naturally aspirated engine with reduced capability due to one or more impeding factors.

The acceleration capability for the naturally aspirated engine may be impeded at times by various factors: for example; an engine temperature, a barometric pressure, a fuel volatility rating, a fuel octane rating, a fuel additive, a humidity level, a combustion chamber deposit value, an altitude value, an engine age, faults within certain components, etc. An engine torque performance profile can then be sent to the AVC 14 for use in determining the vehicle 10 acceleration. FIG. 11 is an exemplary illustration of plots of a naturally aspirated engine. Plot 93 illustrates a reduced acceleration capability of an exemplary vehicle due to one or more of the above mentioned impeding factors, while plot 93 illustrates an unimpeded acceleration capability of the exemplary vehicle.

Predicting the Acceleration Profile

Figure 12:
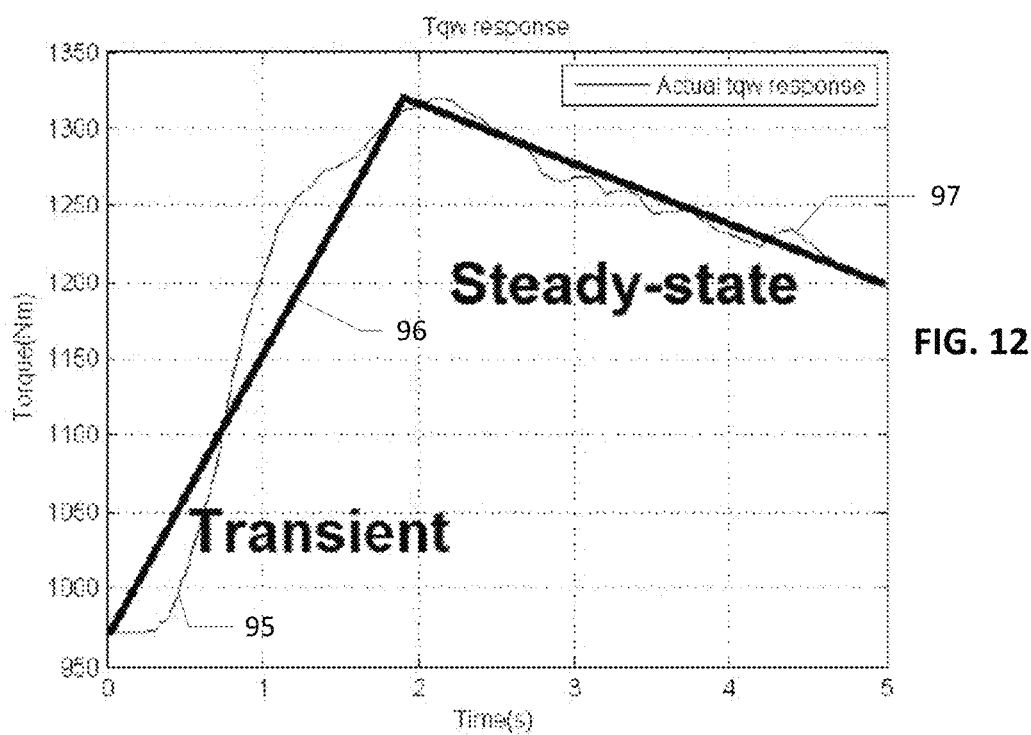
FIG. 12 illustrates an exemplary maximum powertrain acceleration response of a powertrain.

To obtain an accurate powertrain model of the vehicle, the AVC 14, can use the maximum curvature profile, the maximum brake torque capability and the acceleration profile from the from the vehicle control systems ECUs, i.e., the steering controller 18, the powertrain controller 17, and the braking controller 20. For example, the powertrain controller 17 can calculate the maximum wheel torque acceleration response and send it to the AVC 14. FIG. 12 illustrates a simulated calculated exemplary maximum wheel torque acceleration response 95. A transient torque profile is generated for a transient region 96 of the maximum wheel torque acceleration response 95. In this region 96, the acceleration is increasing. A steady-state torque profile can also be determined for a steady-state region 97 where the maximum wheel torque acceleration response 95 begins to decline because of the physical capabilities of the powertrain, such as the wheel torque limiting factors.

Figure 14:
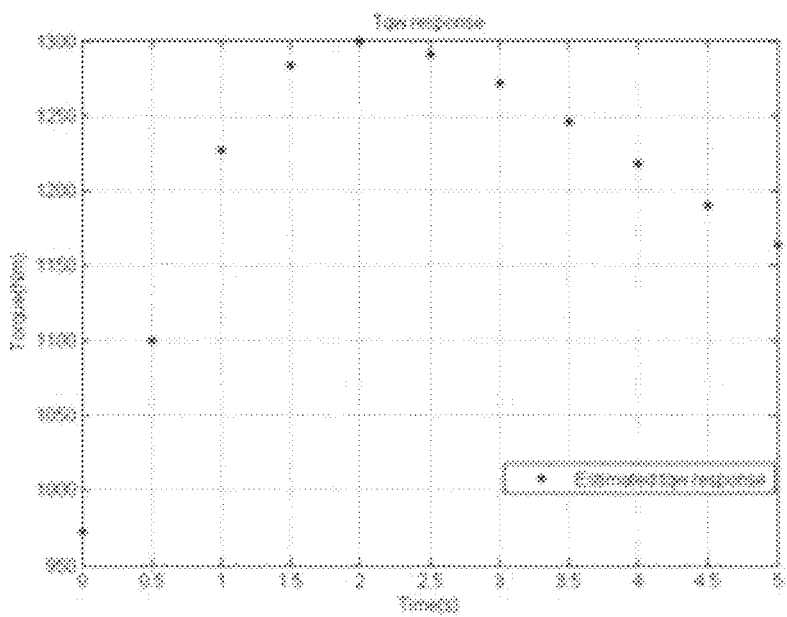
FIG. 14 illustrates an exemplary discrete wheel torque plot of a hybrid electric vehicle (HEV) for a five second interval.
Figure 15:
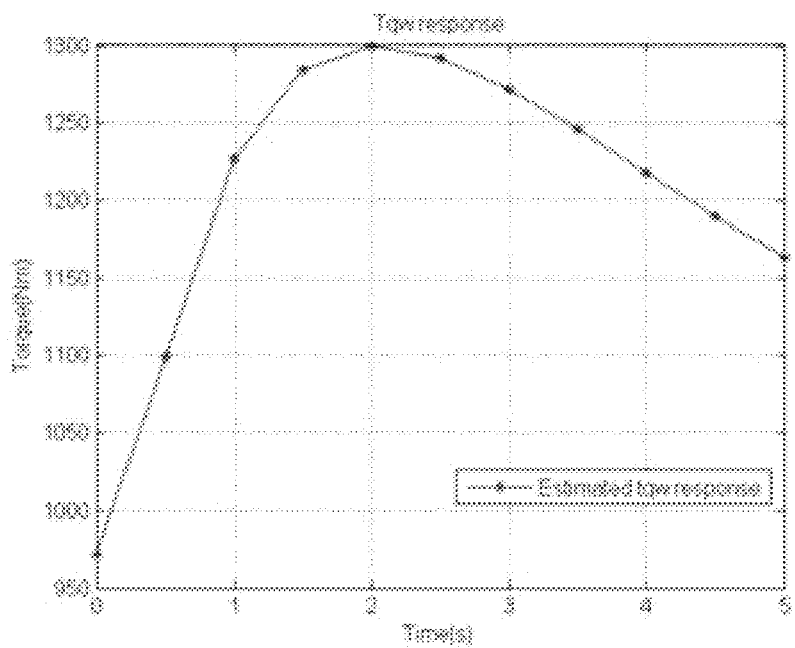
FIG. 15 illustrates an exemplary interpolated wheel torque plot of a hybrid electric vehicle (HEV) for a five second interval.

The maximum wheel torque acceleration response 95, which is the combination of the transient torque profile and the steady-state torque profile, can be used to generate a max torque profile for a given environment. This torque profile can be converted into an equivalent acceleration profile by accounting for things like vehicle mass, road grade, tire size, etc. As discussed above, the capability profile can be sent to the AVC 14 to aid in selecting the best a planning profile (i.e. path to follow). However, sending the entire profile to the AVC 14 over the CAN bus 12 may not be feasible due to CAN bus 12 bandwidth and time limitations. Therefore, the transmitted profiles can be sampled at a finite number of discrete values at fixed time steps. For example, FIG. 14 illustrates a sampled or discrete point wheel torque, which identifies the wheel torque capability of the vehicle 32 at respective discrete times. The finite number of points of the sampled wheel torque profile are then sent over the CAN bus 12 to the AVC 14. The AVC 14 then interpolates the finite number of points to produce an interpolated wheel torque profile, as shown in FIG. 15. For example, the AVC 14, can using the interpolated wheel torque profile to determine the vehicle 32 planning profile. Knowing how the vehicle 32 will operate over a time period, which is five seconds in this example, allows the AVC 14 to actuate various vehicle 32 components, such as throttle or accelerator pedal, steering, etc., according to a determined planning profile and a current driving situation, e.g., a requirement to merge, change lanes, etc. That is, the planning profile has an acceleration capability, i.e., a maximum available acceleration, over the time axis of the planning profile. Based on available acceleration indicated by the planning profile, the AVC 14 may make decisions concerning propulsion and/or steering control to achieve a merge and/or lane change maneuver, e.g., by determining that the vehicle 32 can accelerate to achieve a slot 35, etc.

Referring to FIG. 5, the vehicle 32 is approaching an obstacle comprising the vehicle 30 and the vehicle 37, which for example, may have been involved in an accident. The vehicle 32 must plan an appropriate action before the obstacle. For example, the vehicle 32 can deaccelerate and stop before the obstacle, the vehicle can deaccelerate and maneuver around the obstacle or the vehicle 32 can simply maneuver around the obstacle. The vehicle 32 can use a minimum deceleration capability along with the maximum curvature capability to plan an appropriate maneuver to traverse the obstacle.

Maximum Curvature Capability

FIG. 13B is an exemplary illustration of example of a future maximum curvature capability signal (FMXCS) 99 exchanged between the steering controller 18 and the AVC 14. A maximum left/right curvature capability is the vertical axis which is plotted against time in the horizontal axis. The time interval from indexes t0 to t1 represents a delay in the steering controller 18 responding to the AVC 14 request for the maximum left/right curvature capability from and the therefore, the FMXCS 99 has not been determined. The time from t1-t2 is the ramping up from a current curvature rate to a full curvature rate of the FMXCS 99 based upon a maximum rate of possible change as determined by the steering controller 18. From time t2-t3 the FMXCS 99 rate is reduced. For example, the maximum curvature rate is reduced when the system 10 detects an understeer or oversteer condition of the vehicle 32. In the time frame t3-t4, the FMXCS 99 is reduced even further. For example, when system 10 detects the vehicle 32 is rolling.

Process Flow

Figure 16:
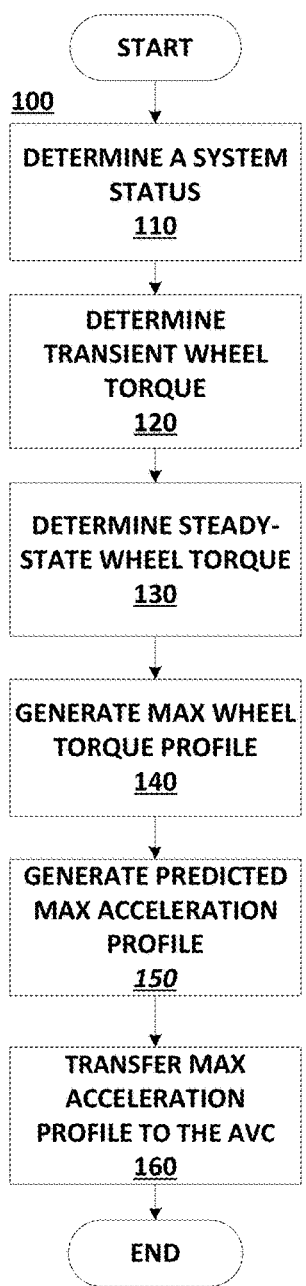
FIG. 16 is a flow chart illustrating an exemplary process of the system for calculating an acceleration profile.

FIG. 16 is a flow chart illustrating an exemplary process 100 of the system 10 for calculating the wheel torque profile of the vehicle 32 from which the acceleration profile can be generated if we know the road grade, vehicle mass, and tire radius.

The process 100 begins in a block 110, in which a system status is obtained by the AVC 14. The AVC 14 determines the system status from data the AVC 14 receives from the various ECUs on the CAN bus 12. The system status can include one or more quantities related to vehicle 32 operation, e.g., a current vehicle speed, a current battery state of charge, a current wheel torque value, a transient torque value, a steady state torque value, a wheel torque over time (see, e.g., FIG. 11), temperature and/or other similar information related to determining an acceleration profile. In addition, the AVC 14 can monitor a CAN Bus status, a power supply level, and a tire saturation value, which can be included in the vehicle 32 system status.

Next, in a block 120, the powertrain controller 17 computes a transient wheel torque for the transient region 96 of the plot of wheel torque (e.g., FIG. 11). The transient wheel torque can be limited by factors which can reduce the total torque available to the vehicle and therefore negatively affect the acceleration of the vehicle. The wheel torque limiting factors can be intentionally implemented using known mechanical or electronic techniques. For example, torque is often reduced to soften the shifting of a transmission. Another example of a torque limiting factor is a transmission input torque limit protects the transmission and drivetrain from damage by a mechanical overload.

Next, in a block 130, the process 100 determines the wheel torque limiting factors for the steady-state region 97. The wheel torque limiting factors for the steady state region 97 can include an engine torque limit, the motor torque limit and the battery system power limit. The engine and motor torque limits are the maximum amount of torque the engine and motor, respectively, can deliver. The system power limit is the maximum available battery power available to the motors of the autonomous vehicle 32.

Next, in a block 140, the system 100 determines a predicted maximum wheel torque profile. The maximum wheel torque is the maximum torque available at the wheels from all propulsion devices (e.g. a typical power split hybrid vehicle will have contributions from an engine and motor) minus any mechanical losses. For example, the mechanical losses can be due to a transmission gear friction or due to gear churning. Gear churning is the drag torque due to the rotation of discs submerged in a fluid, such as transmission gears in a transmission fluid.

Next, profile in a block 150, the predicted maximum acceleration profile is computed. Factors for computing the predicted maximum acceleration profile from the predicted maximum wheel torque profile from block 140, can include the total mass of the autonomous vehicle 32 including passengers and luggage, the road grade, the radius of the wheels, brake control interventions and the road surface conditions. The brake control interventions can include the electronic stability control, roll stability control and traction control. Road factors can include the dynamic interaction between the vehicle's tire and the road surface and negative road surface conditions, such as rain or ice create inefficiencies of the autonomous vehicle 32 use of torque for propulsion, as energy is lost by spinning or slipping tires.

Next, in a block 160, some or all of the maximum acceleration profile determined in the block 150 is provided to the AVC 14, which can use the predicted maximum acceleration profile to determine the most appropriate path given the current conditions, capability of the AVP 16 and desired behavior.

The predicted set of torque values and/or the maximum acceleration profile could, in theory, or given an environment with the right processing and network capacity, can be transferred from the powertrain controller 17 to the AVC 14. However, as discussed above, sending an entire profiles to the AVC 14 over CAN bus 12 is generally not feasible due to CAN bus 12 bandwidth limitations. Therefore, a finite number of discrete points can be extracted from the profile at fixed time steps, e.g., as illustrated in FIG. 14. The finite number of points in the sampled maximum acceleration capability values are then sent over the CAN bus 12 to the AVC 14.

Using the sampled acceleration profile, the AVC 14 interpolates the finite number of points to produce an interpolated planning maximum acceleration profile, as shown in FIG. 15. The interpolated planning maximum acceleration profile is then used by the AVC 14, along with the current situational awareness (an understanding of the relative positions and velocities of the vehicles in the surrounding area) to plan and select the most appropriate path given the current conditions, reported capability of the AVP and desired behavior. The selection of the most appropriate path will be aided by limiting the number of paths to evaluate and select from, to only those that can be robustly achieved by the autonomous vehicle 32 via acceleration requests to the AVP 16. During a merge and/or lane change maneuver the AVC 14 can rule out any paths that are unachievable by the autonomous vehicle under current conditions. Following the block 160, the process 100 ends.

Following the block 160, the process 100 ends.

Figure 17:
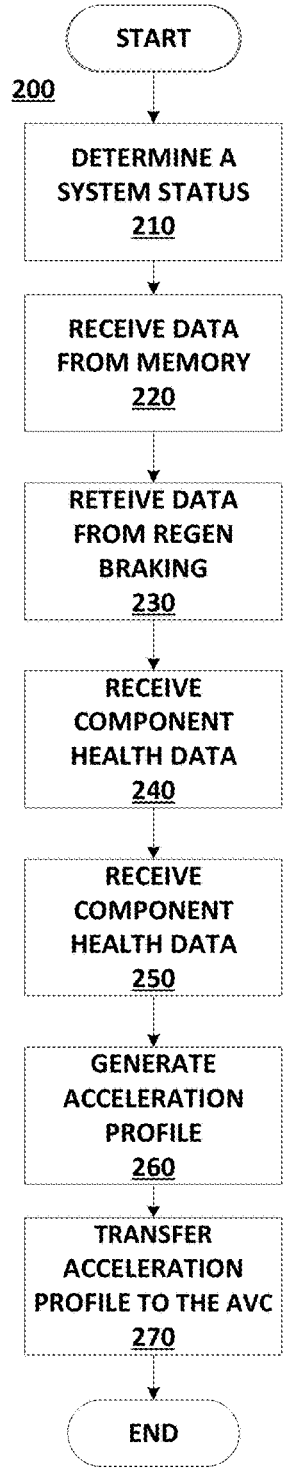
FIG. 17 is a flow chart illustrating an exemplary process of the system for calculating a minimum acceleration capability profile.

FIG. 17 is a flow chart illustrating an exemplary process of the system 10 for calculating the braking profile of the vehicle 32.

The process 200 begins in a block 210, in which a system status is obtained by the AVC 14. The current vehicle 32 state can include the various items as described in the block 110 of the process 100.

Next, in a block 220, the braking controller 20 retrieves parameters related to a stopping capability from memory or from other ECUs, including, e.g., a size of the vehicle 32, which is the vehicle 32 mass along with any additional payload and can include any objects the vehicle 32 may be towing. Additional factors include a road grade value (slope); a road surface mu, a brake pad mu, a pitch angle of the vehicle 32, a load distribution of the vehicle 32, a pressure distribution of the hydraulic brake fluid and detection of any wear or contaminants on the brake pads, such as grooves, water and oil.

Next in a block 230, the braking controller 20 retrieves data from the vehicle 32 regenerative braking system. For example, whether the vehicle 32 is slowing and generating electricity and how much stopping torque the wheel motors can contribute to the stopping ability of the vehicle 32.

Next in a block 240, the braking controller 20 receives data from one or more vehicle 32 stopping systems. For example, the braking controller 20 may detect a brake system fault, for example, an optical sensor on one of the wheel rotors is faulty or a hydraulic fluid level sensor may indicate that the hydraulic fluid level is low and there may be a potential issue with the stopping distance.

Next in a block 250, the braking controller 20 determines from the above factors a braking profile.

Next in a block 260, the braking profile is sent to the ACV 14 for use in determining how maneuvers the vehicle 32 will be executed. For example, with reference to FIG. 5, the AVC 14 detects that the vehicle 32 path is blocked by the car 30 and the car 37 and that there may not be a safe path to travel around the cars. The AVC 14 can then use the braking profile to determine how to effectuate a safe minimum acceleration before the cars 30 37. The AVC 14 can send the braking controller 20 appropriate commands to actuate and monitor the braking system. Additionally, the AVC 14 can send commands to the powertrain controller 17 to reduce or turn off the any energy being applied to the vehicle 32 propulsion system.

Following the block 260, the process 200 ends.

Figure 18:
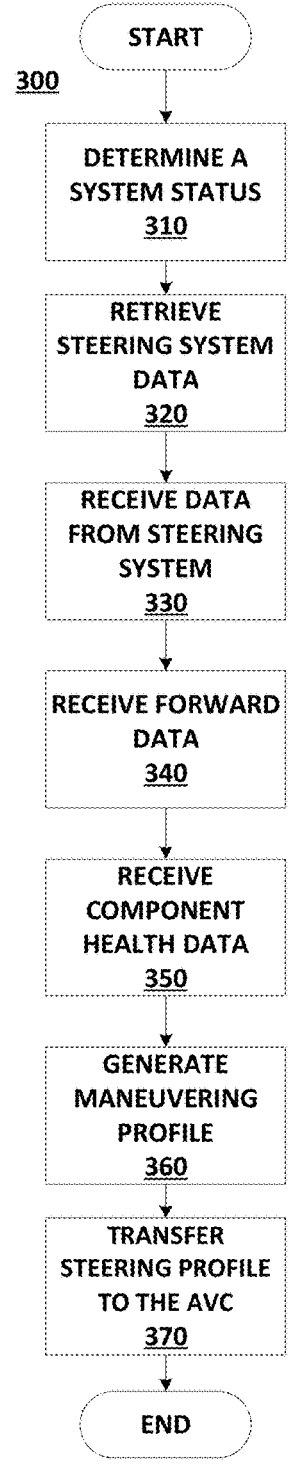
FIG. 18 is a flow chart illustrating an exemplary process of the system for calculating a curvature performance profile.

FIG. 18 is a flow chart illustrating an exemplary process of the system 10 for calculating the maximum curvature profile of the autonomous vehicle 32.

The process 300 begins in a block 310, in which a system status is obtained by the AVC 14. The current vehicle 32 state can include the various items as described in the block 110 of the process 100.

Next, in a block 320, the steering controller 18 retrieves from memory a set of physical characteristics of the vehicle 32. For example, the physical dimensions of the vehicle, weight of the vehicle 32, a minimum turning radius, a center of gravity of the vehicle 32, and an understeer/oversteer gradient value, etc.

Next in a block 330, the steering controller 18 retrieves data from the vehicle 32 steering system's sensors. For example, the received data may include the ground reaction load at the steering axle, the bank angle of the vehicle and trailer, a road surface coefficient value, and vehicle 32 suspension status.

Next in a block 340, the steering controller retrieves forward looking data to assist in the determination of the maximum curvature profile. For example, the steering controller 18 can use the wheel speed sensors and the accelerometer with forward looking information to further determine the maximum curvature capability of the vehicle 32 at a given speed. For example, the vehicle 32 can be traveling at 100 kilometers per hour. If the vehicle 32 was required to make a turn to avoid an obstacle, the radius of the turn would be larger than if the vehicle was to safely make the same maneuver at 30 kilometers per hour. The forward information can be obtained from the map stored in the memory of the steering controller 18. The map can include, for example, road grade, elevation changes, road bank information collected information from previous excursions, just to name a few. As discussed above, the vehicle 32 can obtain forward-looking information via a download from a vehicle-to-infrastructure (VTI) database (not shown) via the vehicle 32 telematics unit (not shown). The forward-looking information can additionally or alternatively be downloaded from a vehicle-to-vehicle data transfer.

Next in a block 350, the steering controller 20 determines whether there are any component problems with the steering system. For example, a wheel speed sensor may be sporadically reporting the wheel speed. An erroneous wheel speed would have an effect on how the steering controller would determine the surface traction coefficient, which in turn can affect how the vehicle 32 would execute a turn or evasive maneuver.

Next in a block 360, the braking controller 20 determines from the above factors the maximum curvature profile.

Next in a block 370, the maximum curvature profile is sent to the ACV 14 for us in determining any maneuvers the vehicle 32 may have to make. For example, with reference to FIG. 5, the AVC 14 detects that the vehicle 32 path is blocked by the car 30 and the car 37 and that there is a safe path to travel around the cars 30 37. The AVC 14 can then use the maximum curvature profile to determine how to effectuate a safe maneuver around the cars 30 37. The AVC 14 can send the steering controller 20 appropriate commands to actuate steering system to effectively maneuver the vehicle 32 around the cars 30 37. Additionally, the AVC 14 may send commands to the powertrain controller 17 and the braking controller 20 to slow the vehicle 32 while maneuvering to avoid the cars 30, 37.

Following the block 370, the process 300200 ends.

CONCLUSION

As used herein, the adverb "substantially" modifying an adjective means that a shape, structure, measurement, value, calculation, etc. may deviate from an exact described geometry, distance, measurement, value, calculation, etc., because of imperfections in the materials, machining, manufacturing, sensor measurements, computations, processing time, communications time, etc.

Computing devices such as those discussed herein generally each include instructions executable by one or more computing devices such as those identified above, and for carrying out blocks or steps of processes described above. Computer executable instructions may be compiled or interpreted from computer programs created using a variety of programming languages and/or technologies, including, without limitation, and either alone or in combination, Java™, C, C++, C#, Visual Basic, Java Script, Perl, HTML, PHP, etc. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

What is claimed is:

1. A system, comprising a computer having a processor and a memory, the memory storing instructions executable by the processor such that the computer is programmed to:
   identify a current state of a ground vehicle, the current state including one or more quantities related to operation of the ground vehicle;
   determine vehicle path curvature limits;
   determine a curvature performance profile to follow based at least in part the vehicle path curvature limits; and
   control a direction of the ground vehicle based at least in part the curvature performance profile.

2. The system of claim 1, wherein the current state of the ground vehicle includes at least one of an internal vehicle state and an environmental condition.

3. The system of claim 2, wherein the computer is further programmed to determine the internal vehicle state of the ground vehicle from in part one or more of a steering wheel angle, a wheel speed sensor, an inertial sensor, an active controller status, a componentry status, a controller area network (CAN) bus status, a power supply level, a current vehicle speed and a tire saturation.

4. The system of claim 2, wherein the computer is further programmed to determine the environmental condition from at least in part one or more of a road grade, a bank, a surface mu and a temperature.

5. The system of claim 1, wherein the computer is further programmed to determine the vehicle path curvature limits from at least in part one or more of the current state of the ground vehicle, a steering system capability model and a vehicle dynamic capability model.

6. The system of claim 5, wherein the current state of the ground vehicle further includes at least one of a lateral acceleration value, a road wheel angle, a steering wheel angle, a yaw rate and a path radius.

7. The system of claim 5, wherein the steering system capability model includes at least one of an asymmetric left to right change value, a maximum rate of change of curvature and data from a vehicle sensor.

8. The system of claim 5, wherein the vehicle dynamic capability model includes at least a suspension geometry and data from a suspension sensor.

9. The system of claim 8, wherein the computer is further programmed to determine a suspension geometry from at least one of a reaction load at steer axle, a bank, a surface mu, a CAN signal loss, a CAN signal corruption, a power supply level and a tire saturation.

10. The system of claim 1, wherein the computer is further programmed to determine the curvature performance profile from at least one of a map stored in the memory, a desired route to follow, the maximum curvature capability of the ground vehicle, a communication from a second vehicle, a communication from an external road infrastructure system and an obstacle detection sensor.

11. The system of claim 10, wherein the obstacle detection sensor includes at least one of a LIDAR sensor, a SONAR sensor and an optical range determination system.

12. The system of claim 1, wherein the computer is further programmed to select an at least one discrete value of the maximum curvature capability;
   send the at least one discrete value to a second computer; and
   regenerate the vehicle path curvature limits by interpolating using the at least one discrete value of the vehicle path curvature limits.

13. The system of claim 1, wherein the vehicle path curvature limits are expressed as a profile that one of (a) includes first series of curvatures for left turns and a second series of curvatures for right turns, (b) includes each of a curvature that is a limit for both left and right turns, a left turn path curvature rate, and a right turn path curvature rate, and (c) includes a combination of a series of left and right path curvatures and curvature rates.

14. A method, comprising:
   identifying a current state of a ground vehicle, the current state including one or more quantities related to operation of the ground vehicle;
   identifying an environmental condition;
   determining vehicle path curvature limits;
   determining a curvature performance profile to follow based at least in part the vehicle path curvature limits; and
   controlling a direction of the ground vehicle based at least in part the curvature performance profile.

15. The method of claim 14, further comprising determining the current state of a vehicle from at least a steering wheel angle, a curvature of vehicle, a wheel speed sensor, an inertial sensor, an active controller status, a componentry status, a controller area network (CAN) bus status, a power supply level, a current vehicle speed and a tire saturation.

16. The method of claim 14, further comprising determining the vehicle path curvature limits from at least in part one or more of the current state of the ground vehicle, a steering system capability model and a vehicle dynamic capability model.

17. The method of claim 16, wherein the current state of the ground vehicle further includes at least one of a lateral acceleration value, a road wheel angle, a steering wheel angle, a yaw rate and a path radius.

18. The method of claim 16, wherein the steering system capability model includes at least one of an asymmetric left to right change value, a maximum rate of change of curvature and a vehicle sensor.

19. The method of claim 16, wherein the vehicle dynamic capability model includes at least one of a reaction load at steer axle value, a bank, a surface mu, a CAN signal loss, a CAN signal corruption, a power supply level and a tire saturation.

20. The method of claim 14, further comprising:
   selecting an at least one discrete value of the vehicle path curvature limits;
   sending the at least one discrete value to a second computer; and
   regenerating the vehicle path curvature limits by interpolating using the at least one discrete value of the vehicle path curvature limits.

* * * * *